UNITED STATES PATENT OFFICE.

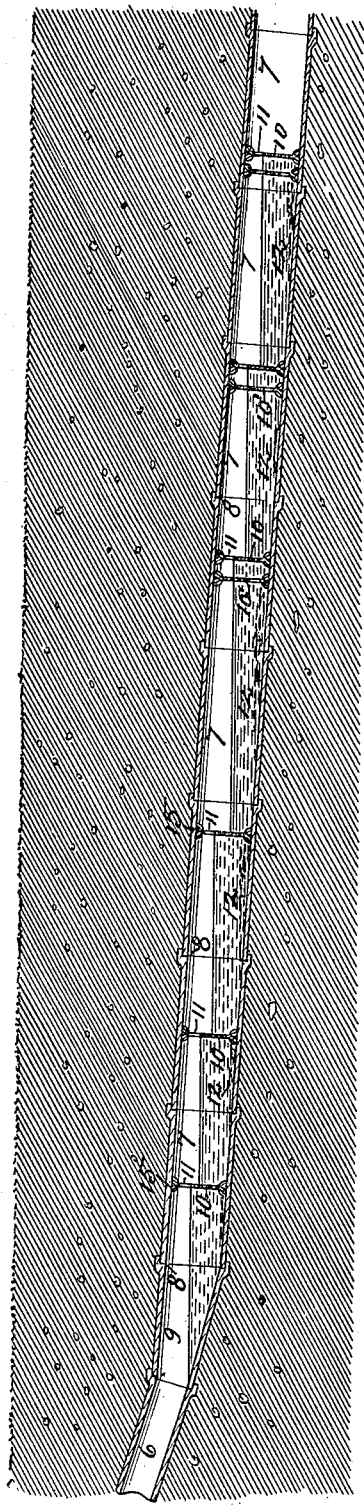

WILBUR H. NICHOLAS, OF INDIANAPOLIS, INDIANA.

SEPTIC-SEWAGE-DISPOSAL PIPE.

1,394,780.  Specification of Letters Patent.  Patented Oct. 25, 1921.

Application filed February 16, 1921. Serial No. 445,306.

*To all whom it may concern:*

Be it known that I, WILBUR H. NICHOLAS, a citizen of the United States, residing at Indianapolis, in the county of Marion and State of Indiana, have invented new and useful Improvements in Septic-Sewage-Disposal Pipes, of which the following is a specification.

It is well known that practically all of the disease-breeding bacteria in sewage will be exterminated by other bacteria propagated in the sewage under suitable conditions, generally heretofore in tanks which retain the bacteria-infected scum while allowing the liquid to escape.

The object of this invention is to simplify and cheapen the construction by adapting the pipes of a drain line to act in the same manner as the tanks would act by the introduction therein of suitable baffle plates arranged in series and spaced apart in distances to be governed by the fall given the pipe line.

I accomplish the above, and other objects which will hereinafter appear, by the means illustrated in the accompanying drawing, in which—

Figure 1 is a longitudinal vertical section of a sewer pipe line with my invention operatively applied. Fig. 2 is a like view of a part of the line on a larger scale. Fig. 3 is a cross section on the line 3—3 of Fig. 2. Fig. 4 is a cross section of a metal baffle plate and Fig. 5 a view in side elevation of a baffle plate before the marginal tongues are bent.

Like characters of reference indicate like parts throughout the several views of the drawing.

In Fig. 1 of the drawing, 6 represents a pipe of a diameter such as is commonly used in a drain line, and 7 those preferably of a larger diameter but of the same usual kind which are joined together at 8 in the usual manner. A suitable section 9, with ends of two different diameters to suit, connects the adjacent sections 6 and 7. The pipe-joints are all cemented together in the usual manner, but before the sections 7 are laid appropriate ones are provided with baffle plates 10 which dam up the liquid matter passing through the pipe line to the level of the bottom of an opening 11 through each plate, which is preferably above the center of the plate. The distance between the baffle plates of a line will depend in large measure upon the fall given the line, they being placed closer together as the descent is increased. This forms pools of liquid corresponding with the contents of the septic tanks heretofore used. A scum of decomposing animal and vegetable matter forms on the liquid pools defined by the baffle plates and in this scum the bacteria are propagated that are the active septic agents. All that is left by the bacteria is chiefly mineral matter that settles to the bottom of the liquid as a sludge 12. To keep the scum from passing from an upper to a lower pool through a hole in the baffle plate I form a trap by inverting a plate 10' and securing it near the lower end of each pool, parallel with and near the lower plate of such pools as it is desired to keep the scum from passing.

The baffle plates 10 and 10' are of identical material and construction. They are here shown as formed out of sheet metal capable of resisting corrosion. These are cut the size and form of the interior of the pipes 7, here shown as circular, but inasmuch as the pipes may be square, polygonal, or other than round, it will be sufficient to say that the plates are shaped to fit the interior of the pipe in which they are to be used. The periphery of the plate is split radially to form an annular series of tongues 13 every alternate ones of which are bent obliquely to the right and the others obliquely in the opposite direction as clearly shown in Fig. 4. These are placed as desired in the pipe sections before the latter are laid, and the plates are held by a suitable cement 15 surrounding the tongues and filling the spaces between the oppositely bent tongues.

A series of pools are thus formed in which the scum, rich in bacteria, is retained on its particular pool-surface while the purely liquid matter passes out as seepage.

Having thus fully described my invention what I claim as new and wish to secure by Letters Patent, is:—

1. A baffle plate for pipe lines having a marginal channel to receive a cementitious agent and being perforate between the channel and center of the plate in one semicircular area only.

2. A baffle plate for pipe lines having diverging marginal members forming a channel to receive a cementing agent and also having a discharge opening between the channel and center of the plate the rest of the plate being imperforate.

3. A baffle plate for pipe lines having outside marginal tongues bent in alternate opposite directions to broaden the bearings of the plate against the pipe and form a channel for cement, said plate being imperforate except for a discharge opening on one side only of its diameter.

Signed at Indianapolis, Indiana, this the 7th day of February, 1921.

WILBUR H. NICHOLAS.